(12) United States Patent
Ben Hassine et al.

(10) Patent No.: US 11,415,535 B2
(45) Date of Patent: Aug. 16, 2022

(54) METHOD AND DEVICE FOR THE NON-DESTRUCTIVE TESTING OF AN ELASTOMER CABLE INSULATION SHEATH

(71) Applicant: Electricite de France, Paris (FR)

(72) Inventors: Mouna Ben Hassine, Avon (FR); Grégory Marque, Fontainebleau (FR)

(73) Assignee: Electricite de France

( * ) Notice: Subject to any disclaimer, the term of this patent is extended or adjusted under 35 U.S.C. 154(b) by 0 days.

(21) Appl. No.: 17/057,274

(22) PCT Filed: May 21, 2019

(86) PCT No.: PCT/EP2019/063040
§ 371 (c)(1),
(2) Date: Nov. 20, 2020

(87) PCT Pub. No.: WO2019/224169
PCT Pub. Date: Nov. 28, 2019

(65) Prior Publication Data
US 2021/0262956 A1 Aug. 26, 2021

(30) Foreign Application Priority Data
May 23, 2018 (FR) ...................................... 1854323

(51) Int. Cl.
*G01N 24/08* (2006.01)
(52) U.S. Cl.
CPC ......... *G01N 24/082* (2013.01); *G01N 24/085* (2013.01)
(58) Field of Classification Search
CPC ..... G01N 24/08; G01N 24/082; G01N 24/085
See application file for complete search history.

(56) References Cited

U.S. PATENT DOCUMENTS 6,437,565 B1 8/2002 Early et al.
7,737,230 B2 * 6/2010 Mihan .................... G01R 33/44
526/72

FOREIGN PATENT DOCUMENTS

CN 101813647 A 8/2010
CN 102998323 A 3/2013
(Continued)

OTHER PUBLICATIONS

Pierre Pubellier et al. "Influence de charges micrometriques sur le vieillissement de composites a matrice polymere" Nov. 28, 2017 (Nov. 28, 2017); Retrieved from the Internet: http://www.icmpe.cnrs.fr/IMG/pdf/resume_these_p_pubellier. pdf.
(Continued)

*Primary Examiner* — Jay Patidar
(74) *Attorney, Agent, or Firm* — Lerner, David, Littenberg, Krumholz & Mentlik, LLP (57) ABSTRACT

The invention relates to a method for non-destructive testing of an insulating sheath (G) of a cable (CB) made of a material of elastomeric polymer. The invention is characterized by a step (E2) of measurement using proton nuclear magnetic resonance on the insulating sheath (G) in order to measure at least a first parameter (P1) characterizing the elastically active chains (A) of the macromolecular network of the elastomeric polymer, comprising the fraction (FCEA) of elastically active chains (A) of the network and/or the average molar mass ($M_c$) of the elastically active chains (A), and by an assessment step (E3) including a comparison of the first parameter (P1) characterizing the elastically active chains (A) and/or of a second parameter (P2), having been determined from the first parameter (P1) characterizing the elastically active chains (A), with at least one prescribed assessment threshold (S) in order to determine that the cable (CB) is at the end of its life when the first parameter (P1)

(Continued)

and/or the second parameter (P2) is/are below the prescribed assessment threshold.

11 Claims, 3 Drawing Sheets

(56) References Cited

FOREIGN PATENT DOCUMENTS

| CN | 103558241 | A | 2/2014 |
|----|-----------|---|--------|
| CN | 106501297 | A | 3/2017 |
| KR | 20120012044 | A | 2/2012 |
| WO | 201360914 | A1 | 5/2013 |

OTHER PUBLICATIONS

Anonymous. "Index of/IMG/pdf" OS Aug. 2019 (Aug. 5, 2019). Retrieved from the Internet: http://www.icmpe.cnrs.fr/IMG/pdf/ [retrieved on Aug. 5, 2019] cited document for indicating the publication date of the first cited document, see p. 17 | 21. line beginning with "resume_these_p_pubelier.pdf".

Gabrielle B, Lorthioir C, Laupre/\tre F. Thermal Aging of Interfacial Polymer Chains in Ethylene-Propylene-Diene Terpolymer/ Aluminum Hydroxide Composites: Solid-State NMR Study. The Journal of Physical Chemistry B. Nov. 3, 2011;115(43):12392-400.

Hassine MB, Naït-Abdelaziz M, Zaïri F, Colin X, Tourcher C, Marque G. Time to failure prediction in rubber components subjected to thermal ageing: A combined approach based upon the intrinsic defect concept and the fracture mechanics. Mechanics of Materials. Dec. 1, 2014;79:15-24.

Gabrielle B, Gomez E, Korb JP Probing rubber cross-linking generation of industrial polymer networks at nanometer scale. The Journal of Physical Chemistry B. Jun. 23, 2016;120(24):5581-9.

Gillen KT, Assink R, Bernstein R, Celina M. Condition monitoring methods applied to degradation of chlorosulfonated polyethylene cable jacketing materials. Polymer degradation and stability. Jun. 1, 2006;91(6):1273-88.

Harris DJ, Assink RA, Gillen KT. 1H T2-NMR monitoring of crosslinked polyolefin aging. Journal of applied polymer science Nov. 28, 2003;90(9):2578-82.

Cornelissen C, Wiesmath A, Schnettler A, Blumich B. Ultrasonic and Nuclear Magnetic Resonance for non-destructive diagnostics of cable systems. InProceedings of the 7th International Conference on Properties and Applications of Dielectric Materials (Cat. No. 03CH37417) Jun. 1, 2003 (vol. 1, pp. 88-91). IEEE.

Preliminary Search Report for French Application 1854323 dated Feb. 25, 2019; 4 pages.

Wang J, Pan S, Zhang Y, Guo S. Crosslink network evolution of BIIR/EPDM blends during peroxide vulcanization. Polymer Testing. May 1, 2017;59:253-61.

International Search Report for PCT/EP2019/063040 dated Aug. 21, 2019; 3 pages.

Simmons, KL et al., "Determining Remaining Useful Life of Aging Cables in Nuclear Power Plants—Interim Study FY13," prepared for the US Dept. of Energy, Pacific Northwest National Laboratory, Sep. 2013, 66 pages.

Hassine MB. Modélisation du vieillissement thermique et mécanique d'une protection externe en EPDM de jonctions rétractables à froid (Doctoral dissertation).

* cited by examiner

METHOD AND DEVICE FOR THE NON-DESTRUCTIVE TESTING OF AN ELASTOMER CABLE INSULATION SHEATH

CROSS-REFERENCE TO RELATED APPLICATIONS

The present application is a national phase entry under 35 U.S.C § 371 of International Application No. PCT/EP2019/063040 filed May 21, 2019, which claims priority from French Application No. 1854323 filed May 23, 2018, all of which are hereby incorporated herein by reference.

The invention relates to a method for non-destructive testing of insulating sheaths of cables, in particular nuclear cables.

One field of application of the invention concerns the electric cables of a nuclear power plants for producing electricity.

In nuclear power plants for producing electricity, on average 1,500 km of cables (including 50 km in the reactor building) are installed per nuclear unit. In service, the cables installed undergo an aging phenomenon, that is to say degradation.

Understanding and monitoring this degradation is essential to ensure the proper functioning of these cables.

The state of aging of a nuclear cable is determined from the elongation at break value of its insulator. This characteristic is measured in laboratory by a mechanical uniaxial tensile test which is a destructive test requiring the sampling of at least 50 cm of the entire cable. Thus, on-site cable sampling campaigns are periodically scheduled, then these cables are analyzed in laboratory, which allows arguing about the end of their life.

The drawback of this type of testing requiring a sampling of cables is above all its destructive nature. In other words, the sampled cable is not returned to service and its replacement involves a significant cost.

The invention aims at obtaining a non-destructive testing method (not requiring cable replacement) that allows reaching a conclusion about the durability of cables.

To this end, a first subject mattert of the invention is a method for non-destructive testing of an insulating sheath made of a material of at least one elastomeric polymer of a cable, characterized in that it includes a step of measurement using proton nuclear magnetic resonance on the insulating sheath in order to measure at least a first parameter characterizing the elastically active chains of the macromolecular network of the elastomeric polymer, and an assessment step including a comparison of the first parameter characterizing the elastically active chains and/or of a second parameter having been determined from the first parameter characterizing the elastically active chains, with at least one prescribed assessment threshold in order to determine that the cable is at the end of its life when the first parameter and/or the second parameter is/are below the prescribed assessment threshold.

According to one embodiment of the invention, the first parameter comprises the fraction of elastically active chains of the macromolecular network of the elastomeric polymer and/or the average molar mass of the elastically active chains of the macromolecular network of the elastomeric polymer.

According to one embodiment of the invention, the first parameter comprises the fraction of elastically active chains of the macromolecular network of the elastomeric polymer, the assessment step including the comparison of the fraction of elastically active chains of the macromolecular network of the elastomeric polymer with the prescribed assessment threshold, in order to determine that the cable is at the end of its life when the fraction of elastically active chains of the macromolecular network of the elastomeric polymer is below the prescribed assessment threshold.

According to one embodiment of the invention, the measurement step includes a measurement of a transverse proton relaxation using proton nuclear magnetic resonance on the insulating sheath in order to determine at least from this measurement the fraction of elastically active chains of the macromolecular network of the elastomeric polymer.

According to one embodiment of the invention, the first parameter comprises the average molar mass of the elastically active chains of the macromolecular network of the elastomeric polymer, the second parameter includes an elongation at break having been determined from the average molar mass of the elastically active chains, the assessment step including the comparison of the elongation at break with the prescribed assessment threshold in order to determine that the cable is at the end of its life when the elongation at break is below the prescribed assessment threshold.

According to one embodiment of the invention, the measurement step includes a measurement of the increase in proton two-quantum coherences using proton nuclear magnetic resonance on the insulating sheath in order to determine at least from this measurement the average molar mass of the elastically active chains of the macromolecular network of the elastomeric polymer.

According to one embodiment of the invention, the average molar mass of the elastically active chains is calculated based on the residual dipolar coupling having been measured by the measurement of the increase in proton two-quantum coherences using proton nuclear magnetic resonance.

According to one embodiment of the invention, the average molar mass of the elastically active chains is calculated as being proportional to the inverse of the residual dipolar coupling having been measured by the measurement of the increase in proton two-quantum coherences using proton nuclear magnetic resonance.

According to one embodiment of the invention, the average molar mass $M_c$ of the elastically active chains is calculated from the equation $$M_c = (D_{stat}/k)^{3/5} \cdot r^2 / D_{res}$$

where $D_{stat}$ is a predetermined static dipolar coupling, $D_{res}$ is the residual dipolar coupling having been measured by the measurement of the increase in proton two-quantum coherences using proton nuclear magnetic resonance, k is a predetermined parameter of local coupling topology and of motions between segments of the material, r is the predetermined ratio of the end-to-end chain length for a portion of chains between topological constraints and the average value of this end-to-end chain length at equilibrium for the material.

According to one embodiment of the invention, the method includes a step of taking a sample of the insulating cable sheath, the step of measurement using proton nuclear magnetic resonance being carried out on the sample.

According to one embodiment of the invention, the taken mass of the sample of the insulating sheath of the cable during the sampling step is from 20 to 40 mg.

According to one embodiment of the invention, the method includes a step of bringing a device for measurement using proton nuclear magnetic resonance into contact with the insulating sheath of the cable, the measurement step being carried out by the device for measurement using proton nuclear magnetic resonance.

A second subject matter of the invention is a computer program, including code instructions for implementing the method as described above, when it is implemented on a calculator.

A third subject matter of the invention is a device for non-destructive testing of an insulating sheath made of a material of at least one elastomeric polymer of a cable, characterized in that it includes a device for measurement using proton nuclear magnetic resonance on the insulating sheath in order to measure at least a first parameter characterizing the elastically active chains of the macromolecular network of the elastomeric polymer, and a calculator for implementing an assessment step including a comparison of the first parameter characterizing the elastically active chains and/or of a second parameter having been determined from the first parameter characterizing the elastically active chains, with at least one prescribed assessment threshold in order to determine that the cable is at the end of its life when the first parameter and/or the second parameter is below the prescribed assessment threshold.

The invention will be better understood upon reading the following description given only by way of non-limiting example with reference to the appended drawings, wherein.

Figure 4:
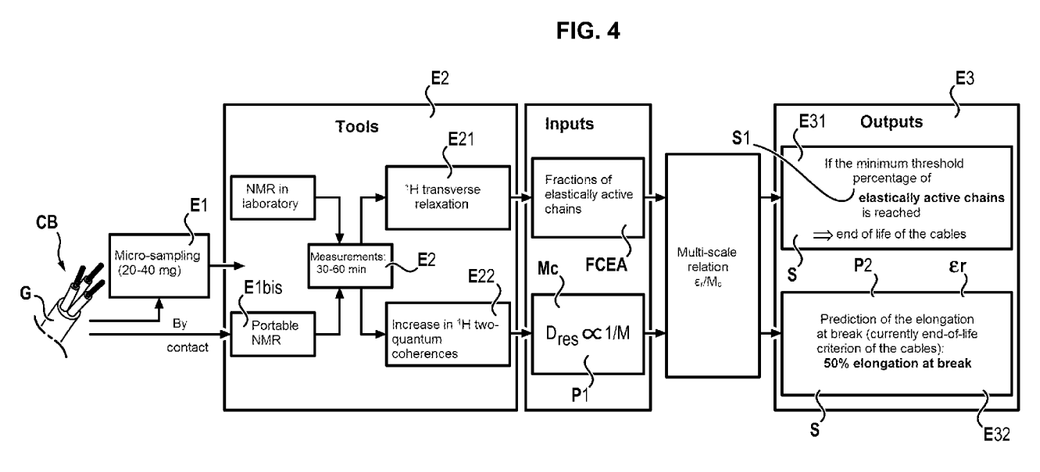

The method for non-destructive testing of an insulating sheath G of a cable CB, according to embodiments of the invention, is described below with reference to FIG. 4. The insulating sheath G of the cable CB is made of an electrically insulating material, which includes at least one elastomeric polymer. This material can be, for example, made of EPDM or others. The cable CB can be, for example, an electric cable or others, disposed in a nuclear power plant for producing electricity. As represented in FIG. 4, in such a nuclear power plant, the cable CB and its insulating sheath G can be subjected to high stresses, in particular to ionizing radiations which may be of 0.1 Gy·h$^{-1}$ (h designating an hour) and to temperatures which may be of 50° C., which may lead to accelerated aging of the cable CB and of its insulating sheath G. The invention is also applicable to any cable including an insulating sheath. The invention is also applicable to any elastomeric polymer material, such as for example a seal, a pipe lining, a floor element, any sealing element, a tire.

According to one embodiment of the invention, the method includes a first step E1 of taking a sample of the insulating sheath G of a cable CB. This can be done by one or more micro-samples of the material of the sheath G (a few milligrams) that do not affect the functionality of the cables C and are therefore not destructive. This sample is taken in small quantities. For example, the taken mass of the sample of the insulating sheath G of the cable CB during the sampling step E1 is from 20 to 40 mg. This low mass represents a sample of about (2×5×5) mm$^3$. For example, the maximum insulator length that can be taken from a cable on site, at the end of the cable, without impacting its functionality, is estimated at 1 cm. There is no constraint on the shape of the sample to be taken. The sample has preferably always the same shape, rather symmetrical shape (like a washer for example), in order to always modify in the same way the magnetic field of the magnet when it is inserted in the spectrometer of the measurement device during the measurement step E2 described below. This step E1 is quick and rather simple to implement. Thereby, this ensures a non-destructive monitoring in terms of functionality of the cable CB, which can therefore be maintained on site to continue to operate.

In one variant, it may be provided, in addition to or instead of the first step E1 of taking a sample of the insulating cable sheath, a first step E1*bis* of bringing a device for measurement using proton nuclear magnetic resonance into contact with the sheath G of the cable CB, for example at the location where the cable CB is installed on site, in the case where this measuring device is portable and brought to this location. Here again, the step E1*bis* of bringing the device for measurement using proton nuclear magnetic resonance into contact with the sheath G ensures non-destructive monitoring in terms of functionality of the cable CB, which can thus be maintained on site to continue to work.

After the first step E1 and/or E1*bis*, a second step E2 of measurement using solid-state proton nuclear magnetic resonance (the abbreviation of which is: $^1$H NMR) is carried out on the insulating sheath G, in order to measure at least a first parameter P1 characterizing the elastically active chains A of the macromolecular network of the elastomeric polymer of the insulating sheath G of the cable CB. This second measurement step E2 can be implemented by the device for measurement using proton nuclear magnetic resonance having been brought to the location of the cable in the case of step E1 and/or on the sample taken from the sheath G of the cable CB by a device for measurement using proton nuclear magnetic resonance present in a laboratory.

According to one embodiment of the invention, the first parameter P1 comprises the fraction FCEA of elastically active chains A of the macromolecular network of the elastomeric polymer, which is calculated from the measurement using proton nuclear magnetic resonance and/or the average molar mass $M_c$ of the elastically active chains A of the macromolecular network of the elastomeric polymer, which is calculated from the measurement using proton nuclear magnetic resonance.

The topology of the macromolecular network (chemistry) correlates with the mechanical properties of the polymeric material of the sheath G. Indeed, the relevant macromolecular material parameters reflect the state of the cable CB. According to one embodiment of the invention, these parameters comprise the proportions FCEA of the families of the macromolecular chains of the network (elastically active chains A, pendant chains B, extractables C) and/or the molar mass distribution $M_c$ between crosslinking nodes. Preferably, these two analyzes relate specifically to the elastically active chains A, to which a threshold S will be applied. They are directly linked to the mechanical strength of the insulating sheath G impacting the lifetime of the cables C. The lifetime of the cable CB and its functionality are linked to the integrity of the insulating sheath G. This integrity is described by the mechanical behavior of the material. The study of the macromolecular network of the polymer insulator of the sheath G only requires a micro-sampling in the case where step E1 described above is implemented, thus allowing non-destructive testing of the cable, or requires no sampling in the case where step E1bis described above is implemented. It should be noted that the term "elastically active chains A" is a term specific to the family of elastomers. For the other families of polymers, there are simply referred to as macromolecular chains.

The solid-state proton nuclear magnetic resonance ($^1$H NMR) is a technique of physicochemical analysis of the polymers. It is a non-destructive technique allowing the characterization of the macromolecular network. It can be used as a main tool for monitoring the modifications of the material during aging.

After the second measurement step E2, a third step E3 of assessing the state of aging of the cable CB from the first parameter P1 and/or from a second parameter P2 which is determined from the first parameter characterizing the elastically active chains A, is carried out. This third assessment step E3 includes a comparison of the first parameter P1 and/or of the second parameter with at least one prescribed assessment threshold S and a determination that the cable CB is at the end of its life when the first parameter P1 and/or the second parameter P2 is less than the prescribed assessment threshold S.

Use of the Fraction FCEA of Elastically Active Chains A:

A first family of embodiments of the method using the first parameter P1 is described below.

According to one embodiment, the first parameter P1 comprises the fraction FCEA of elastically active chains A of the macromolecular network of the elastomeric polymer. The assessment step E3 includes the comparison E31 of the fraction FCEA of elastically active chains A of the macromolecular network of the elastomeric polymer with the prescribed assessment threshold S which is a threshold $A_{THRESHOLD}$ of the fraction of elastically active chains. This threshold $A_{THRESHOLD}$ is identified based on the type of the material. It is determined that the cable CB is at the end of its life when the fraction FCEA of elastically active chains A of the macromolecular network of the elastomeric polymer is below the prescribed assessment threshold S.

According to one embodiment, the measurement step E2 includes a measurement E21 of a transverse proton relaxation using proton nuclear magnetic resonance on the insulating sheath G. The fraction FCEA of elastically active chains A of the macromolecular network of the elastomeric polymer is determined at least from this measurement E21.

According to one embodiment, the measurement E21 of the transverse proton relaxation allows obtaining a $^1$H transverse relaxation signal, which can be obtained using 3 complementary experiments: solid echo (at short times) and Hahn/CARR-Purcell-Meiboom-Gill echo (CPMG) (intermediate and long times). This measurement E21 allows obtaining the proportion of the components of the network by measuring the $^1$H transverse relaxation signal. These experiments provide important information about the mobility of the protons in the network. Thus, 3 populations of macromolecular chains of the network can be identified due to very different dynamics within the polymer network, as shown in FIGS. 1 and 2.

Figure 1:
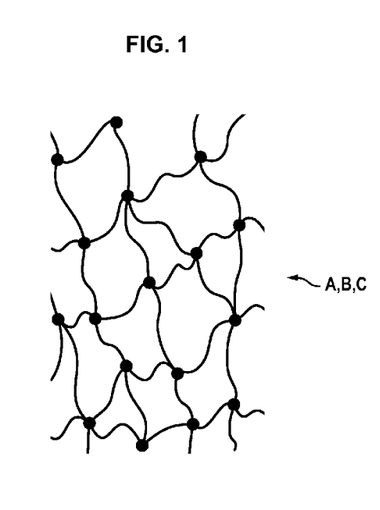
FIGS. 1 and 2 schematically represent a molecular network of an elastomer of a cable sheath, FIG. 3 schematically represents a transverse relaxation signal for an elastomeric network of a cable sheath, which can be used according to one embodiment of the invention, FIG. 4 schematically represents a modular block diagram of the non-destructive testing method according to one embodiment of the invention.
Figure 2:
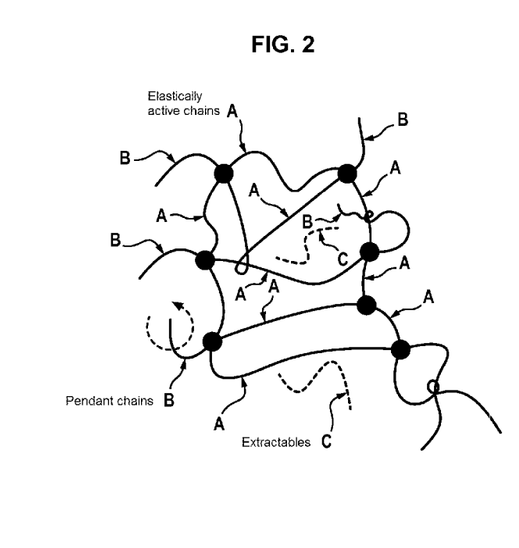

In FIGS. 1 and 2, the elastically active chains A are chains crosslinked or entangled at their two ends. The pendant chains B are chains crosslinked or entangled by only one end, or chain ends. The extractables C are non-crosslinked/free chains in the macromolecular network. The pendant chains B as well as the extractables C do not participate in the elasticity: they are elastically inactive. The mechanical properties are then governed mainly by the elastically active chains A. The analysis of the $^1$H transverse relaxation signal allows determining the fractions of the different portions of chains A, B and C of the network.

According to one embodiment, the molar fraction B of pendant chains and the molar fraction C of extractable in the network are first determined via the $^1$H transverse relaxation measurement. The fractions B and C are obtained from the $^1$H transverse relaxation signal M(t), having been measured by the measurement E21, by means of the following fitting analysis:

$$M(t)=B\exp(-t/T2b)+C\exp(-t/T2c)$$

where M(t) is the magnitude of the magnetization,

T2b is the $^1$H transverse relaxation time related to the protons of the pendant chains B, which is obtained from M(t), T2c is the $^1$H transverse relaxation time related to the protons of the extractables C, which is obtained from M(t).

Figure 3:
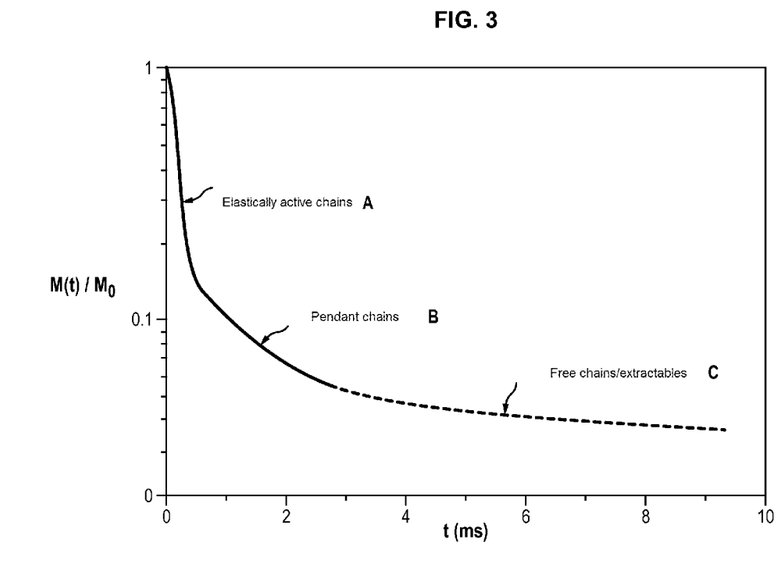

FIG. 3 schematically represents the transverse relaxation signal $M(t)/M_0$ on the ordinate (in logarithmic scale) as a function of time t on the abscissa, for an elastomeric network made up of the 3 relaxation components A, B and C, where $M_0$ is a defined constant. As shown in FIG. 3, these extractables C (represented in broken lines) correspond to the points of M(t), located after extinction of the component related to the protons of the elastically active chains A (which is the first relaxation component).

The simple subtraction FCEA=1−B−C gives the fraction FCEA of elastically active chains A in the network.

The determination of the fraction FCEA of elastically active chains A by NMR allows knowing the position relative to the threshold $A_{THRESHOLD}$:

if FCEA>$A_{THRESHOLD}$, the mechanical strength of the material is considered as satisfactory, if FCEA<$A_{THRESHOLD}$, the material is considered as degraded and no longer able to ensure good strength.

In addition, if there is the evolution of the kinetics of the fraction FCEA of elastically active chains A (with accelerated aging tests for example), it is then possible to determine the residual lifetime of the material.

Thus, a measurement of the fraction FCEA of elastically active chains A below the threshold $A_{THRESHOLD}$ indicates that the cable CB is at the end of its service life, and consequently the cable CB is in a state of too advanced aging and must be replaced by a new cable CB on site.

Thus, the method according to the invention allows obtaining reliable information on the wear of the cable CB, according to which a maintenance operation on the cable can be decided.

Use of the Average Molar Mass $M_c$ of the Elastically Active Chains A:

A second family of embodiments of the method using the second parameter P2 is described below.

According to one embodiment, the second parameter P2 includes an elongation $\varepsilon_r$ at break, having been determined from the average molar mass $M_c$ of the elastically active chains A of the first parameter P1.

According to one embodiment, the assessment step E3 includes the comparison E32 of the elongation $\varepsilon_r$ at break with the prescribed assessment threshold S, which is a threshold S2 of elongation at break. It is determined that the cable CB is at the end of its life when the elongation $\varepsilon_r$ at break is below the prescribed assessment threshold S2.

According to one embodiment, the measurement step E2 includes a measurement E22 of the increase in proton two-quantum coherences using solid-state proton nuclear magnetic resonance on the insulating sheath G. The average molar mass $M_c$ of the elastically active chains A of the macromolecular network of the elastomeric polymer is determined at least from this measurement E22.

According to one embodiment, the measurement E22 of increase in the $^1H$ two-quantum coherences is obtained based on the sequence of Baum & Pines, improved by Saalwächter.

The analysis allows obtaining the experimental curve $I_{DQ}$ showing the evolution in the amplitude of the $^1H$ two-quantum coherences as a function of the excitation time $t_{DQ}$.

The analytical description of the $^1H$ coherence increase curves $I_{DQ}$ gives the value of the distribution of the residual coupling $D_{res}$ of the network, according to the following equation:

$$I_{DQ}(t_{DQ}) = \int_0^{DStat} P(D_{res}) f(t_{DQ}, D_{res}) dD_{res}$$

where $D_{stat}$ is a defined distribution constant, $P(D_{res})$ is a defined distribution density.

$D_{res}$ in (Hz) corresponds to the residual dipolar coupling, measured by means of the NMR experiment. It is the average dipolar coupling of a segment of chains between topological constraints in the network. The more distant the topological constraints, the weaker $D_{res}$ because it is averaged by more molecular motions.

$D_{stat}$ (in Hz) corresponds to the static dipolar coupling, it is the one measured for the protons in the absence of molecular motions (to obtain it, it would be necessary to carry out a measurement at very low temperature for a polymer). $D_{stat}$ is the value of the static $^1H$-$^1H$ dipolar coupling. $D_{stat}$ can be calculated from $^1H$-$^1H$ distances at a repeating unit, disregarding any molecular motion.

k is unitless, it is a parameter that allows taking into account an additional average effect derived from the motions inside a Kuhn segment (motions on the order of a few hundred picoseconds, librations and conformational jumps). k is specific to each polymer.

$P(D_{res})$ is the function of distribution of the residual dipolar coupling for the studied material. For some materials, $P(D_{res})$ can be a Gausian probability density. For the EPDM, in order to describe the heterogeneities at the level of $P(D_{res})$, $P(D_{res})$ is calculated from an asymmetric probability density said "log-normal", which is as follows:

$$f(x; \sigma, \mu) = \frac{1}{x\sigma\sqrt{2\pi}} e^{\frac{-[ln(x)-\mu]^2}{2\sigma^2}}$$

where $\mu$ and $\sigma$ are two adjustable parameters.

From the parameters of the distribution $P(D_{res})$ determined for the crosslinked, unfilled EPDM ($\mu=0.752$; $\sigma=0.506$), it is possible to plot the distribution of the residual dipolar couplings within the network, before aging.

$f(t_{DQ}, D_{res})$ is a core function that reflects the increase of the curve $I_{DQ}(t_{DQ})$, obtained by the DQ $^1H$ double-quantum measurement, if only one residual dipolar coupling was present in the network. In other words, this equation allows describing the increase in the coherences for a perfect single-mode network, without the help of any distribution.

For the elastomeric polymer of the material, the function $f(t_{DQ}, D_{res})$ can be of the type:

$$f(t_{DQ}, D_{res}) = 0.5[1 - e^{-(Qt_{DQ})^{1.5}} \cos(UD_{res}t_{DQ})]$$

where Q and U are first and second predetermined coefficients.

For example, for the aforementioned EPDM material, $Q=0.378$ and $U=0.583$ and the function $f(t_{DQ}, D_{res})$ is:

$$f(t_{DQ}, D_{res}) = 0.5[1 - e^{-(0.378 D_{Rest} DQ)^{1.5}} \cos(0.583 D_{res} t_{DQ})]$$

Of course, the function $f(t_{DQ}, D_{res})$ may be different for another elastomeric polymer or for another polymer.

The distribution of $D_{res}$ can be transformed into a distribution of the average molar mass $M_c$ between macromolecular chains (topological constraints that encompass the entanglements and the crosslinking nodes), according to the following equation:

$$k\frac{D_{res}}{D_{Stat}} = \frac{3}{5}\frac{r^2}{N}$$

where N is the number of Khun segments between crosslinking nodes, which is proportional to the average molar mass $M_c$ of the polymer, r and k are parameters associated with the material and can be determined by molecular dynamics.

$r^2$ corresponds to the square of the ratio between the end-to-end vector (or the end-to-end chain length) for a portion of chains between topological constraints ($R^2$) and the average value of this vector (or of the end-to-end chain length) at equilibrium (average $R^2$). $r^2$ is often the object of a Gaussian-type distribution. $D_{res}$ depends on the inverse of the average molar mass $M_c$ and on the inverse of the average molar mass $M_e$ of the entangled chains.

$$D_{res} \propto 1/M_c + 1/M_e$$

This distribution of $D_{res}$ can be considered as the distribution of the molar mass between topological constraints (M).

It is assumed that $1/M_e$ is much less than $1/M_c$ (the entanglements are neglected).

$M_c$ can be calculated via the equation above, which links $D_{res}$ to the molar mass $M_c$ via the factor $G=(D_{stat}/k)\cdot 3/5 \cdot r^2$. It is thus possible to calculate:

$$D_{res} = (D_{stat}/k) \cdot 3/5 \cdot r^2/M_c$$

The following thus applies:

$$M_c = (D_{stat}/k) \cdot 3/5 \cdot r^2/D_{res}$$

The following thus applies:

$$M_c = G/D_{res}$$

The predominant parameter that governs the mechanical properties and their degradation being the elastically active chains, the evolution of their molar mass ($M_c$) is a good indicator and in direct correlation with the evolution of the elongation at break $\varepsilon_r$.

Knowing the average molar mass $M_c$ of the elastically active chains A, a multi-scale relation connecting $M_c$ to the elongation $\varepsilon_r$ at break allows predicting the value of the elongation $\varepsilon_r$ at break of the analyzed material and therefore reaching a conclusion about its state of degradation relative to the critical threshold value S2.

Thus, a measurement of an average molar mass ($M_c$: average molar mass of the chains between crosslinking nodes and $M_e$: average molar mass of the entangled chains) of the material will give an indication on the value of the elongation $\varepsilon_r$ at break. For example, a value of the elongation $\varepsilon_r$ at break less than 50% of the threshold S2 of elongation at break in absolute value indicates that the cable has crossed the limit of its service life.

If there is the evolution of the kinetics of $M_c$ of the material (with accelerated aging tests for example), it is then possible to determine the evolution of the kinetics of the elongation $\varepsilon_r$ at break thanks to the multi-scale relation. This approach allows determining the residual lifetime of the material.

An example of the relation between the average molar mass $M_c$ of the elastically active chains A and the elongation ϑr at break is described below.

An example of the relation between the macromolecular scale ($M_c$) and the macroscopic scale ($\varepsilon_r$) uses a methodology based on the breaking mechanics and on the concept of the intrinsic defect to predict the breaking of the elastomer (for a material whose post-crosslinking is the predominant process during aging).

The input data are:
The value of the tearing energy $J_{c0}$ of the unaged material, obtained on a cracked test piece: test piece SENT (single notch),
The elongation at break of a tensile test piece as well as the stress curve as a function of the deformation on unaged material. ($\square_{c0}$, $W_0 = f(\square)$), the index 0 referring to the unaged material.

From these input data, it is possible to calculate the size of the intrinsic defect $a^{th}$:

$$a^{th} = \frac{J_{c_0}}{4 \cdot k(\lambda_{c_0}) \cdot W_{c_0}} \quad \text{(Equation 1)}$$

$$\text{with } k(\lambda) = \frac{\pi}{\sqrt{\lambda}}$$

where $a^{th}$ is the theoretical size of the intrinsic defect,
$J_{c0}$ is the tearing energy of the unaged material,
$k(\lambda)$ is a proportionality factor in the case of a test piece DENT.

In the case of EPDM, an intrinsic defect length ($2a^{th}$) equal to 0.5 mm (diameter of a fictitious circular defect in a uniaxial tensile test piece) was found and will be allowed for any other EPDM.

$M_c = f(t \times a_T)$: The evolution in the molar mass $M_c$ as a function of the reduced time $t \times a_T$ is:

$$M_c = M_{C1} + a_1 e^{a_2 t a_T} \quad \text{(Equation 2)}$$

obtained by time-temperature equivalence.
$t \times a_T$ denotes t multiplied by $a_T$.
$a_T$ is a sliding factor of the time-temperature equivalence curve.
$a_1$, $a_2$ are constants obtained by least squares regressions,
$M_{c1}$ is a parameter obtained by least squares regression,
t is the time in hour.
The output data are $J_c$ and $W_c$.
$J_c$ is the critical break tearing energy.
$W_c$ is the deformation energy density at break.
$J_c = f(M_c)$: The value of $J_c$ for a given value of the molar mass $M_c$ is:

$$J_c = \frac{A}{M_{c0}}\left(\sqrt{M_c} - \sqrt{M_{c0}}\right) \quad \text{(Equation 3)}$$

With for EPDM: A=125 kJ/m² and $M_{c0}$=678 g/mol (represents the threshold value below which the material has zero tearing energy).

$W_c = f(M_c)$: the value of the corresponding deformation energy density $W_c$.

As a first approximation, an assumption is made of a Gaussian model that allows writing:

$$W = \frac{\rho R T}{2 M_c}\left(1 - \frac{2}{f}\right)(\lambda_1^2 + \lambda_2^2 + \lambda_3^2 - 3) \quad \text{(Equation 4)}$$

where R and T are the gas constant and the absolute temperature respectively, $\rho$ is the density, f is a functionality factor depending on the number of segments starting from a crosslinking node,
W is the deformation energy density,
$\lambda_1$, $\lambda_2$, $\lambda_3$ are the eigenvalues of the deformation gradient tensor.

For a given value of $M_c$, the one of the corresponding $J_c$ can be deduced (equation 3), as well as the corresponding deformation energy density $W_c$ calculated by a numerical method from the equation 4 with $\lambda_2 = \lambda_3 = \lambda_1^{-1/2}$ in the case of uniaxial tension.

Knowing the size of the intrinsic defect $a^{th}$, it is possible to obtain the elongation $\lambda_c$ at break by solving the following equation:

$$J_c = 4 k_c a^{th} W_c \quad \text{(Equation 5)}$$

With:

$$K_c = \frac{\pi}{\sqrt{\lambda_c}} \quad \text{(Equation 6)}$$

The elongation $\varepsilon_r$ at break is expressed by:

$$\varepsilon_r = \lambda_c - 1 \quad \text{(Equation 7)}$$

The molar mass between topological constraints M obtained here implies the contribution of both the entanglements ($M_e$) and the crosslinking nodes ($M_c$). That is to say M (obtained by NMR via the previous equation) can be decomposed into:

$$M = M_c + M_e$$

where $M_c$ is the molar mass between crosslinking nodes and $M_e$ is the molar mass between entanglements and $M_e$ is generally given in the databooks.

$$M_c = M - M_e$$

The end-of-life criterion is set at an elongation at break threshold of 50% in absolute.

The described approach can be enhanced by two distinct applications:
Use of the tool for assessing the state of the material at time t knowing its $M_c$ (measured by NMR),
Use as a predictive tool: knowing the evolution of the molar mass $M_c$ of the material, it is possible to obtain the evolution of the elongation $\varepsilon_r$ at break and thus predict the end of life of the cable.

In these first and second families of embodiments, the third assessment step E3 can implement the comparison E31 and/or the comparison E32.

The method described above can be implemented on a calculator (which may be a computer, processor(s), microprocessor(s) or the like) for the assessment step E3. This calculator may have been programmed by a computer program, including code instructions for implementing the method, when it is implemented on this calculator.

Of course, the embodiments, characteristics, possibilities and examples above can be combined with each other or selected independently of each other.

The invention claimed is:

1. A method for non-destructive testing of an insulating sheath made of a material of at least one elastomeric polymer of a cable,
comprising a step of measurement using proton nuclear magnetic resonance on the insulating sheath in order to measure at least a first parameter characterizing elastically active chains of a macromolecular network of the at least one elastomeric polymer,
the step of measurement comprising a measurement of an increase in proton two-quantum coherences using the proton nuclear magnetic resonance on the insulating sheath in order to determine at least from the measurement an average molar mass of the elastically active chains of the macromolecular network of the at least one elastomeric polymer,
the first parameter comprising the average molar mass of the elastically active chains of the macromolecular network of the at least one elastomeric polymer,
wherein the average molar mass $M_c$ of the elastically active chains is calculated from the equation $$M_c = (D_{stat}/k)^{3/5} \cdot r^2 / D_{res}$$

where
$D_{stat}$ is a predetermined static dipolar coupling,
$D_{res}$ is a residual dipolar coupling having been measured by the measurement of the increase in proton two-quantum coherences using the proton nuclear magnetic resonance,
k is a predetermined parameter of local coupling topology and of motions between segments of the material,
r is a predetermined ratio of an end-to-end chain length for a portion of chains between topological constraints and an average value of the end-to-end chain length at equilibrium for the material,
and an assessment step comprising a comparison of the first parameter characterizing the elastically active chains with at least one prescribed assessment threshold in order to determine that the cable is at an end of its life when the first parameter is below the at least one prescribed assessment threshold.

2. The method according to claim 1, wherein the first parameter further comprises the fraction of elastically active chains of the macromolecular network of the at least one elastomeric polymer,
the assessment step comprising the comparison of the fraction of elastically active chains of the macromolecular network of the at least one elastomeric polymer with the prescribed assessment threshold, in order to determine that the cable is at the end of its life when the fraction of elastically active chains of the macromolecular network of the at least one elastomeric polymer is below the prescribed assessment threshold.

3. The method according to claim 2, wherein the step of measurement comprises a measurement of a transverse proton relaxation using the proton nuclear magnetic resonance on the insulating sheath in order to determine at least from this measurement the fraction of elastically active chains of the macromolecular network of the at least one elastomeric polymer.

4. The method according to claim 1, comprising a step of taking a sample of the insulating sheath of the cable, the step of measurement using the proton nuclear magnetic resonance being carried out on the sample.

5. The method according to claim 1, wherein a taken mass of the sample of the insulating sheath of the cable during the step of taking is from 20 to 40 mg.

6. The method according to claim 1, comprising a step of bringing a device for measurement using the proton nuclear magnetic resonance into contact with the insulating sheath of the cable, the step of measurement being carried out by the device for measurement using the proton nuclear magnetic resonance.

7. A device for non-destructive testing of an insulating sheath made of a material of at least one elastomeric polymer of a cable, the device comprising
a device for measurement of an increase in proton two-quantum coherences using proton nuclear magnetic resonance on the insulating sheath in order to measure at least a first parameter characterizing elastically active chains of a macromolecular network of the at least one elastomeric polymer, the first parameter comprising the average molar mass of the elastically active chains of the macromolecular network of the at least one elastomeric polymer,
the device for measurement being able to make a measurement of an increase in proton two-quantum coherences using the proton nuclear magnetic resonance on the insulating sheath in order to determine at least from the measurement an average molar mass of the elastically active chains of the macromolecular network of the at least one elastomeric polymer,
wherein the average molar mass $M_c$ of the elastically active chains is calculated from the equation $$M_c = (D_{stat}/k)^{3/5} \cdot r^2 / D_{res}$$

where
$D_{stat}$ is a predetermined static dipolar coupling,
$D_{res}$ is a residual dipolar coupling having been measured by the measurement of the increase in proton two-quantum coherences using the proton nuclear magnetic resonance,
k is a predetermined parameter of local coupling topology and of motions between segments of the material,
r is a predetermined ratio of an end-to-end chain length for a portion of chains between topological constraints and an average value of the end-to-end chain length at equilibrium for the material,
and a calculator for implementing an assessment step comprising a comparison of the first parameter characterizing the elastically active chains with at least one prescribed assessment threshold in order to determine that the cable is at an end of its life when the first parameter is below the prescribed assessment threshold.

8. A method for non-destructive testing of an insulating sheath made of a material of at least one elastomeric polymer of a cable,
comprising a step of measurement using proton nuclear magnetic resonance on the insulating sheath in order to measure at least a first parameter characterizing elastically active chains of a macromolecular network of the at least one elastomeric polymer,
the step of measurement comprising a measurement of an increase in proton two-quantum coherences using the proton nuclear magnetic resonance on the insulating sheath in order to determine at least from the measurement an average molar mass of the elastically active chains of the macromolecular network of the at least one elastomeric polymer,
the first parameter comprising the average molar mass of the elastically active chains of the macromolecular network of the at least one elastomeric polymer, wherein the average molar mass $M_c$ of the elastically active chains is calculated from the equation $$M_c = (D_{stat}/k)^{.3/5} \cdot r^2 / D_{res}$$

where $D_{stat}$ is a predetermined static dipolar coupling, $D_{res}$ is a residual dipolar coupling having been measured by the measurement of the increase in proton two-quantum coherences using the proton nuclear magnetic resonance, k is a predetermined parameter of local coupling topology and of motions between segments of the material, r is a predetermined ratio of an end-to-end chain length for a portion of chains between topological constraints and an average value of the end-to-end chain length at equilibrium for the material, and an assessment step comprising a comparison of a second parameter, having been determined from the first parameter characterizing the elastically active chains, with at least one prescribed assessment threshold in order to determine that the cable is at an end of its life when the second parameter is below the prescribed assessment threshold.

9. The method according to claim 8, wherein the second parameter comprises an elongation at break having been determined from the average molar mass of the elastically active chains, the assessment step comprising the comparison of the elongation at break with the prescribed assessment threshold in order to determine that the cable is at the end of its life when the elongation at break is below the prescribed assessment threshold.

10. A device for non-destructive testing of an insulating sheath made of a material of at least one elastomeric polymer of a cable, the device comprising a device for measurement of an increase in proton two-quantum coherences using proton nuclear magnetic resonance on the insulating sheath in order to measure at least a first parameter characterizing elastically active chains of a macromolecular network of the at least one elastomeric polymer, the first parameter comprising the average molar mass of the elastically active chains of the macromolecular network of the at least one elastomeric polymer, the device for measurement being able to make a measurement of an increase in proton two-quantum coherences using the proton nuclear magnetic resonance on the insulating sheath in order to determine at least from the measurement an average molar mass of the elastically active chains of the macromolecular network of the at least one elastomeric polymer, wherein the average molar mass $M_c$ of the elastically active chains is calculated from the equation $$M_c = (D_{stat}/k)^{.3/5} \cdot r^2 / D_{res}$$

where $D_{stat}$ is a predetermined static dipolar coupling, $D_{res}$ is a residual dipolar coupling having been measured by the measurement of the increase in proton two-quantum coherences using the proton nuclear magnetic resonance, k is a predetermined parameter of local coupling topology and of motions between segments of the material, r is a predetermined ratio of an end-to-end chain length for a portion of chains between topological constraints and an average value of the end-to-end chain length at equilibrium for the material, and a calculator for implementing an assessment step comprising a comparison of a second parameter having been determined from the first parameter characterizing the elastically active chains with at least one prescribed assessment threshold in order to determine that the cable is at an end of its life when the second parameter is below the prescribed assessment threshold.

11. The device according to claim 10, wherein the second parameter comprises an elongation at break having been determined from the average molar mass of the elastically active chains, the assessment step comprising the comparison of the elongation at break with the prescribed assessment threshold in order to determine that the cable is at the end of its life when the elongation at break is below the prescribed assessment threshold.

\* \* \* \* \*